(12) United States Patent
You et al.

(10) Patent No.: US 11,848,708 B2
(45) Date of Patent: Dec. 19, 2023

(54) CAPACITY OPTIMIZATION METHOD FOR MOBILE OPTICAL WIRELESS COMMUNICATION SYSTEM AND COMMUNICATION METHOD AND SYSTEM

(71) Applicant: SOOCHOW UNIVERSITY, Suzhou (CN)

(72) Inventors: Xiaodi You, Suzhou (CN); Gangxiang Shen, Suzhou (CN)

(73) Assignee: SOOCHOW UNIVERSITY, Suzhou (CN)

( * ) Notice: Subject to any disclaimer, the term of this patent is extended or adjusted under 35 U.S.C. 154(b) by 155 days.

(21) Appl. No.: 17/630,825

(22) PCT Filed: Sep. 7, 2020

(86) PCT No.: PCT/CN2020/113662
§ 371 (c)(1),
(2) Date: Jan. 27, 2022

(87) PCT Pub. No.: WO2022/036766
PCT Pub. Date: Feb. 24, 2022

(65) Prior Publication Data
US 2022/0416904 A1     Dec. 29, 2022

(30) Foreign Application Priority Data

Aug. 21, 2020   (CN) .......................... 202010850413.4

(51) Int. Cl.
*H04B 10/114*     (2013.01)
*H04B 10/516*     (2013.01)
(Continued)

(52) U.S. Cl.
CPC ... *H04B 10/5161* (2013.01); *H04B 10/07953* (2013.01); *H04W 24/02* (2013.01); *H04W 64/003* (2013.01)

(58) Field of Classification Search
CPC .................................................. H04B 10/114
See application file for complete search history.

(56) References Cited

U.S. PATENT DOCUMENTS

2018/0302157 A1   10/2018   Wei et al.

FOREIGN PATENT DOCUMENTS

| CN | 105245275 A | 1/2016 |
|---|---|---|
| CN | 107332615 A | 11/2017 |

OTHER PUBLICATIONS

Yan et al., Sensitivity Comparison of Time Domain Hybrid Modulation and Rate Adaptive Coding, OFC 2016, W1I-3, OSA 2016 (Year: 2016).*

(Continued)

*Primary Examiner* — Shi K Li
(74) *Attorney, Agent, or Firm* — SZDC LAW P.C.

(57) ABSTRACT

The present invention discloses a capacity optimization method for a mobile optical wireless communication system and a communication method and system. The capacity optimization method includes the following steps: establishing a mobile channel impulse response model; calculating an electrical signal-to-noise ratio (SNR) of an output of a receiver; calculating bit error rate (BER) values of an optical wireless communication system in different candidate modulation formats according to the electrical SNR of the output of the receiver; selecting a first modulation format and a second modulation format from the different candidate modulation formats; determining quantities of chips in the first modulation format and the second modulation format in each data frame; and building a time domain hybrid modulation frame according to the quantities of chips in the first modulation format and the second modulation format, modulating data by using the time domain hybrid modulation frame, and performing data transmission.

10 Claims, 6 Drawing Sheets

(51) Int. Cl.
   *H04B 10/079*   (2013.01)
   *H04W 24/02*    (2009.01)
   *H04W 64/00*    (2009.01)

(56)           References Cited

OTHER PUBLICATIONS

You et al., Location-Aware Time Domain Hybrid Modulation for Mobile Visible Light Communication, Asia Communications and Photonics Conference 2020, OSA, 2020 (Year: 2020).*

Kiaodi You et al, "Efficient Dimming Control with Time Domain Hybrid Modulation in Indoor Hybrid Visible Light / Infrared Communication Systems" 2019 24th OptoElectronics and Communications Conference (OECC) and 2019 International Conference on Photonics in Switching and Computering (PSC) (Jul. 7, 2019).

* cited by examiner

CAPACITY OPTIMIZATION METHOD FOR MOBILE OPTICAL WIRELESS COMMUNICATION SYSTEM AND COMMUNICATION METHOD AND SYSTEM

This application is the National Stage Application of PCT/CN2020/113662, filed on Sep. 7, 2020, which claims priority to Chinese Patent Application No. 202010850413.4, filed on Aug. 21, 2020, which is incorporated by reference for all purposes as if fully set forth herein.

FIELD OF THE INVENTION

The present invention relates to the field of optical communication technologies, and more particularly to a capacity optimization method for a mobile optical wireless communication system and a communication method and system.

DESCRIPTION OF THE RELATED ART

With the continuous development of mobile Internet, Internet of Things, virtual reality, and other technologies, a lot of research has been conducted on indoor optical wireless communication technologies. However, these researches have mainly focused on point-to-point transmission scenarios between stationary terminals. In recent years, in diverse optical wireless communication applications, users or services have increasing demand for terminal mobility. For example, home users want to access the Internet via light from different indoor positions and have a desirable user experience. In industrial scenarios, sensors and relay nodes mounted on mobile robotic arms and production lines need to have premium quality of service during the use of light interconnections. However, the movement of an optical wireless communication receiver may lead to time variation in an optical wireless communication channel, which poses a challenge for implementing high-speed optical wireless communication. Since the spatial distribution of indoor light intensity is not uniform, electrical signal-to-noise ratio (SNR) performance of a received optical signal may fluctuate greatly even if a user terminal only moves or changes its orientation within a single cell. If a conventional fixed modulation format for static transmission scenarios is used, it is difficult to keep the spectral efficiency and transmission capacity of a system dynamically optimal, and it is difficult to provide mobile users with high-speed and uninterrupted data transmission services.

A conventional adaptive modulation technique is used in a current solution. In the solution, a training sequence is transmitted to estimate a channel. A receive end feeds back real-time channel state information obtained from channel estimation to a transmit end. The transmit end adaptively selects and optimizes a modulation format, a modulation order, and other parameters according to a channel state. The conventional adaptive modulation technique has the following disadvantages: For a single-carrier system, the correspondence between the spectral efficiency achievable with a single modulation format and the longest transmission distance that the single modulation format can support remains discrete. For example, when a mobile terminal is located between the longest transmission distances supported by two modulation formats (for example, PAM2 and PAM4), only the lower-order modulation format (that is, PAM2) can be selected to ensure the transmission quality of a link. As a result, the optimal spectral efficiency cannot be achieved. Although the use of multi-carrier OFDM technology can further improve the spectral efficiency, in order to perform adaptive modulation of OFDM signals, complete (for example, individual frequency points) channel state information usually needs to be fed back. Therefore, when a terminal moves, constant changes of a channel may lead to a large amount of feedback overhead, reducing the uplink transmission efficiency and making it difficult to maintain reliable transmission performance of the system with constrained uplink transmission resources. In addition, OFDM has higher processing complexity and a higher peak-to-average signal ratio compared with a single-carrier modulation scheme, which may cause a degradation in the performance of the system.

SUMMARY OF THE INVENTION

A technical problem to be solved by the present invention is to provide a capacity optimization method for a mobile optical wireless communication system and a communication method and system. The method can effectively adapt to an actual state of a mobile optical wireless channel, and a signal transmission scheme is adaptively adjusted and optimized according to movement state information of a terminal, so that the spectral efficiency and mobile transmission capacity of a system are dynamically optimal, thereby ensuring reliable transmission quality of a link, and satisfying specific requirements of different types of services.

To solve the foregoing technical problems, the present invention provides a capacity optimization method for a mobile optical wireless communication system, including the following steps:

S1: acquiring position information of a transmitter, position information and orientation information of a receiver, and establishing a mobile channel impulse response model;

S2: calculating an electrical SNR of an output of the receiver based on the mobile channel impulse response model;

S3: calculating bit error rate (BER) values of an optical wireless communication system in different candidate modulation formats according to the electrical SNR of the output of the receiver, to obtain a plurality of groups of BER values;

S4: selecting a first modulation format and a second modulation format from the different candidate modulation formats, where a BER value corresponding to the first modulation format is greater than a preset BER threshold, and a BER value corresponding to the second modulation format is less than the preset BER threshold;

S5: determining quantities of chips in the first modulation format and the second modulation format in each data frame, to enable an average hybrid BER of the first modulation format and the second modulation format to be less than the preset BER threshold, where the quantities of chips in the first modulation format and the second modulation format maximize corresponding transmission capacity of the optical wireless communication system; and S6: building a time domain hybrid modulation frame according to the quantities of chips in the first modulation format and the second modulation format, modulating data by using the time domain hybrid modulation frame, and performing data transmission.

Preferably, S3 further includes: sorting the obtained plurality of groups of BER values in descending order, to obtain the sorted plurality of groups of BER values; and in S4, the BER values corresponding to the first modulation format and the second modulation format are adjacent values in the sorted plurality of groups of BER values.

Preferably, S6 includes:

comparing a quantity $N_k$ of chips in the first modulation format with a quantity $N_{k+1}$ of chips in the second modulation format, and if $N_k \geq N_{k+1}$, letting I=floor($N_k/N_{k+1}$), where in a process of building a time domain hybrid modulation data frame structure, every time I symbols in the first modulation format are transmitted, one symbol in the second modulation format is transmitted, symbols in the two modulation formats are alternately transmitted, and when all chips have been transmitted, one frame has been transmitted, or if $N_k < N_{k+1}$, letting I=ceil($N_{k+1}/N_k$), where in a process of building a time domain hybrid modulation data frame structure, every time I symbols in the second modulation format are transmitted, one symbol in the first modulation format requires to be transmitted, symbols in the two modulation formats are alternately transmitted, and when all chips have been transmitted, one frame has been transmitted.

Preferably, S1 specifically includes:

obtaining a mobile channel impulse response according to terminal movement states T, R, and O:

$$h(t; T, R, O) = \sum_{i=1}^{N_{LED}} w_i \left[ H_{i,los}(0; T_i, R, O) \cdot \delta(t - \tau_{i,los}) + \int_{\tau_{i,nlos}=0}^{+\infty} A_{i,nlos}(\tau_{i,nlos}; T_i, R, O) \cdot \delta(t - d\tau_{i,nlos}) \right],$$

where coordinates $T_i$ of the transmitter are $(x_{ti}, y_{ti}, z_{ti})$, i denotes an $i^{th}$ LED light source, coordinates R of the receiver are $(x_r, y_r, z_r)$, an orientation O of the receiver is $(\alpha, \beta)$, $\alpha$ is an orientation angle of the direction of the receiver, and $\beta$ is a polar angle of the direction of the receiver; $N_{LED}$ is a quantity of LED light sources; and for the $i^{th}$ LED light source, $w_i$ is a weighting coefficient of a transmit power of the light source, $\tau_{i,los}$ and $\tau_{i,nlos}$ are respectively signal propagation delays of a line-of-sight link and a non-line-of-sight link, $H_{i,los(O)}$ is a normalized direct-current gain of the line-of-sight link, and $A_{i,nlos}$ is a normalized channel gain of the non-line-of-sight link.

Preferably, S2 specifically includes:

$$SNR(T, R, O; R_s) = \frac{P_{r,sig}(T, R, O; R_s)}{P_{r,isi}(T, R, O; R_s) + N(T, R, O; R_s)} = \frac{\left[\gamma \int_{t_0}^{t_0+1/R_s} P_t m s(t) \otimes h(t; T, R, O) dt\right]^2}{\left[\gamma \int_{t_0+1/R_s}^{+\infty} P_t m s(t) \otimes h(t; T, R, O) dt\right]^2 + \left[\sigma_{shot}^2(T, R, O; R_s) + \sigma_{thermal}^2(R_s)\right]},$$

where $P_{r,sig}$ is a power of a received signal, $P_{r,isi}$ represents inter-code interference, N is formed by a shot noise variance $\sigma^2_{shot}$ and a thermal noise variance $\sigma^2_{thermal}$, $\gamma$ is the photoelectric conversion efficiency of a photodetector, $t_0$ is an integrated pulse onset time, $R_s$ is a pulse rate, $P_t$ is an average transmit power of each light source, m is a modulation index of a transmitted signal, s(t) is a normalized rectangular pulse, and $\otimes$ represents a convolution operation;

where the shot noise is further denoted as:

$$\sigma^2_{shot}(T,R,O;R_s) = \frac{2q[\gamma|_{t_0}^{+\infty} P_t s(t) \otimes h(t;T,R,O)dt + I_{bg}I_2]}{R_s},$$

where q is the number of electron charges, $I_{bg}$ is a background current, and $I_2$ is a noise bandwidth factor; and the thermal noise is denoted as:

$$\sigma^2_{thermal}(R_s) = 8\pi k T_k \mu A R_s^2 \left( \frac{I_2}{G} + \frac{2\pi \Gamma \mu A I_3 R_s}{g_m} \right),$$

where k is a Boltzmann constant, $T_k$ is an absolute temperature, $\mu$ is a fixed capacitance, A is an area of a photoelectric detector, $g_m$ is a transconductance of a field effect transistor (FET), $\Gamma$ is a channel noise factor of the FET, G is an open-loop voltage gain, and $I_3$=0.0868.

Preferably, S3 specifically includes the following steps:

calculating BERs of the optical wireless communication system as:

$$BER(T, R, O) = \begin{cases} \frac{1}{2} \text{erfc}\left( \frac{\sqrt{SNR(T, R, O) \cdot \log_2 L}}{2\sqrt{2(L-1)}} \right) & \text{For PAM} \\ \frac{1}{2} \text{erfc}\left( \frac{1}{2\sqrt{2}} \sqrt{\frac{SNR(T, R, O) \cdot L \cdot \log_2 L}{2}} \right) & \text{For PPM} \end{cases},$$

here, L-PAM and L-PPM of different modulation orders are used as candidate modulation formats, PAM is pulse amplitude modulation, PPM is pulse position modulation, and L is a signal modulation order; and calculating a BER corresponding to each different candidate modulation format, and arranging all BER values in descending order, to obtain $BER_1$ (T, R, O), $BER_2$ (T, R, O), ..., $BER_K$ (T, R, O), modulation formats corresponding to which are respectively denoted as a format 1, a format 2, ..., a format K.

Preferably, S4 specifically includes:

when the terminal movement states are (T, R, O), setting the BER threshold to be $BER_T$; and when $BER_K$ (T, R, O) $\geq BER_T > BER_{K+1}$(T, R, O) is satisfied, selecting a format k and a format k+1 to build a time domain hybrid modulation data frame, where $1 \leq k < k+1 \leq K$, the format k is denoted as the first modulation format, and the format k+1 is denoted as the second modulation format.

Preferably, S5 includes the following steps:

S51: calculating an average hybrid BER of a time domain hybrid modulation data frame as:

$$BER_{Hybrid}(T, R, O) = \frac{D \cdot SE_k(T, R, O) \cdot BER_k(T, R, O) + (1-D) \cdot SE_{k+1}(T, R, O) \cdot BER_{k+1}(T, R, O)}{D \cdot SE_k(T, R, O) + (1-D) \cdot SE_{k+1}(T, R, O)} \leq BER_T,$$

where D denotes a proportion of the foregoing format k, a range of D is $0 \leq D \leq 1$, and $SE_k$ and $SE_{k+1}$ respectively denote spectral efficiencies of the modulation format k and the modulation format k+1;

S52: obtaining an optimal value of D, denoted as $D_{opt}$, to maximize a dynamic transmission capacity of the optical wireless communication system, specifically including: gradually decreasing D starting from D=1 with an increment ΔD<0, and once the value of D fails to satisfy that the average hybrid BER is less than the preset BER threshold $BER_T$, subtracting ΔD from the current value of D, and using a result of the subtraction as $D_{opt}$ in the movement states (T, R, O); and S53: for the modulation format k, a quantity of chips required in each frame is $N_k$=floor($N_{total}\times D_{opt}$) for the modulation format k+1, a quantity of chips required in each frame is $N_{k+1}$=ceil($N_{total}\times(1-D_{opt})$), where floor( ) denotes rounding down, ceil( ) denotes rounding up, and $N_{total}$ is a total quantity of chips in each time domain hybrid modulation data frame.

The present invention discloses a communication method of a mobile optical wireless communication system, optimized based on the capacity optimization method for a mobile optical wireless communication system, and including the following steps:

acquiring different time domain hybrid modulation frames for preset BER thresholds of different service types and different pulse rate levels;

storing time domain hybrid modulation frames corresponding to different preset BER thresholds and pulse rate levels in a database; and acquiring a current preset BER threshold and pulse rate level, invoking a corresponding time domain hybrid modulation frame in the database, and performing optical wireless communication.

The present invention discloses a mobile optical wireless communication system, including a transmitter and a receiver, where an optimization module is disposed on the transmitter or the receiver, and the optimization module implements the foregoing capacity optimization method for a mobile optical wireless communication system;

when the optimization module is disposed on the receiver, the optimization module calculates optimization parameter information for a time domain hybrid modulation frame, the optimization parameter information for the time domain hybrid modulation frame is transmitted by the receiver to the transmitter, and the transmitter builds the time domain hybrid modulation frame according to the received optimization parameter information for the time domain hybrid modulation frame, and performs data transmission;

when the optimization module is disposed on the transmitter, the receiver transmits position information of the receiver and orientation information of the receiver to the transmitter, the optimization module calculates optimization parameter information for a time domain hybrid modulation frame, the transmitter builds the time domain hybrid modulation frame according to the received optimization parameter information for the time domain hybrid modulation frame, the transmitter transmits the time domain hybrid modulation frame and the optimization parameter information for the time domain hybrid modulation frame to the receiver, and the receiver demodulates the time domain hybrid modulation frame according to the received optimization parameter information for the time domain hybrid modulation frame.

The beneficial effects of the present invention are as follows:

1. The present invention is based on single-carrier modulation, has a simple structure and high flexibility in real-time processing, and can effectively avoid the inherent defects of an OFDM technology.

2. The present invention is applicable to a mobile optical wireless communication system. A receiver feeds back simple movement state information of a terminal to a transmitter, so that a state of a mobile optical wireless channel can be efficiently estimated, and the transmission overhead of an uplink feedback link can be effectively reduced.

3. In the present invention, the spectral efficiency and transmission capacity of a system can be dynamically optimized based on movement state information perceived by a terminal, so that the present invention can efficiently adapt to the time variance of an electrical SNR in an optical wireless channel and achieve dynamic optimization of the spectral efficiency and transmission capacity during terminal movement.

4. The present invention can implement continuous change of transmission capacity of the system as the position and orientation of the receiver changes, which is conducive to the smooth switching of carried services and the continuous and smooth transition between transmission rates.

5. The present invention can meet BER thresholds specified for different services, thereby ensuring reliable mobile transmission quality of an optical wireless communication link.

6. The present invention can effectively adapt to actual states of a mobile optical wireless channel, and adaptively adjust and optimize a signal transmission scheme according to movement state information of a terminal.

DETAILED DESCRIPTION OF THE PREFERRED EMBODIMENTS

The present invention is further described below with reference to the accompanying drawings and specific embodiments, to enable a person skilled in the art to better understand and implement the present invention. However, the embodiments are not used to limit the present invention.

Figure 1:
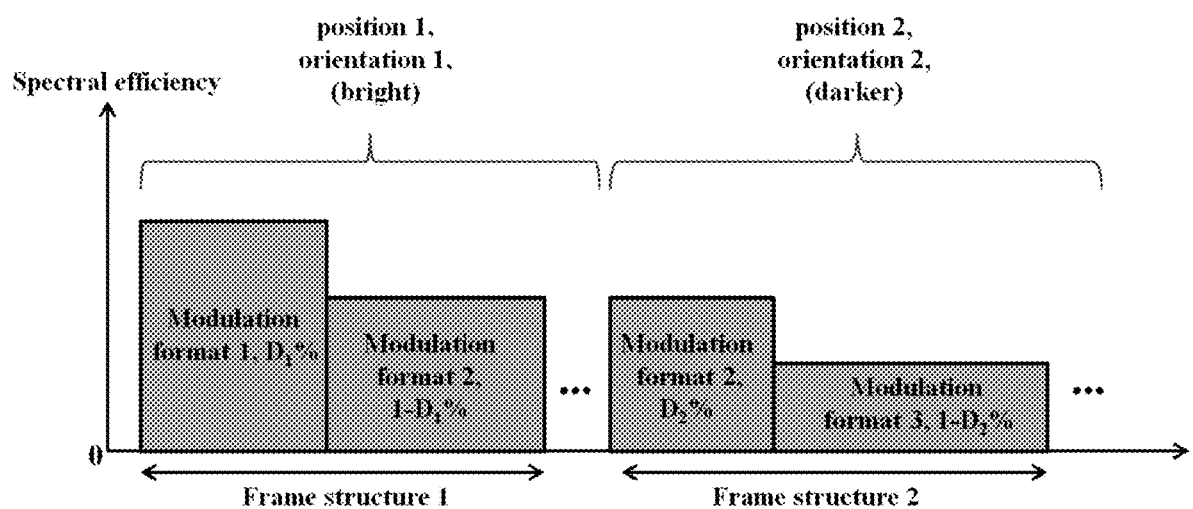
FIG. 1 is a principle diagram according to the present invention.

FIG. 1 is a principle diagram according to the present invention. In an indoor optical wireless communication system, when a terminal moves or changes an orientation (that is, the direction of the angle of view of a receiver), both an optical power and an SNR of the reception of the receiver fluctuate. For conventional single-carrier modulation, to adapt to changes in an SNR, the most effective modulation format needs to be selected. However, for a mobile optical wireless communication system, it is difficult to achieve optimal spectral efficiency using discrete modulation formats. For example, when a terminal is located between the longest transmission distances supported by two modulation formats (for example, PAM2 and PAM4), only the lower-order modulation format (that is, PAM2) can be used to ensure reliable link quality. This clearly cannot achieve optimal spectral efficiency. To improve the spectral efficiency, a time domain hybrid modulation scheme that perceives a movement state of the receiver is proposed, as shown in FIG. 1. With time division multiplexing, two different modulation formats are alternately used for transmission, so as to adaptively adjust the average spectral efficiency according to the time-varying conditions of a mobile channel. For example, when a terminal is located in a bright area with a high SNR, two modulation formats with high spectral efficiency are mixed (a modulation format 1 with higher spectral efficiency accounts for D1%) to form a frame structure 1 to obtain higher spectral efficiency. When the terminal moves to a dark area with a low SNR, two modulation formats with low spectral efficiency are mixed (a modulation format 2 with higher spectral efficiency accounts for D2%) to form a frame structure 2 to ensure the link transmission quality and meet the sensitivity requirement of the receiver. The mobile transmission capacity of a system can be effectively increased by ensuring that an average BER in each frame is just below a BER threshold (for example, $BER_T=4.6\times10^{-3}$) specified in the adopted forward error correction (FEC).

Figure 2:
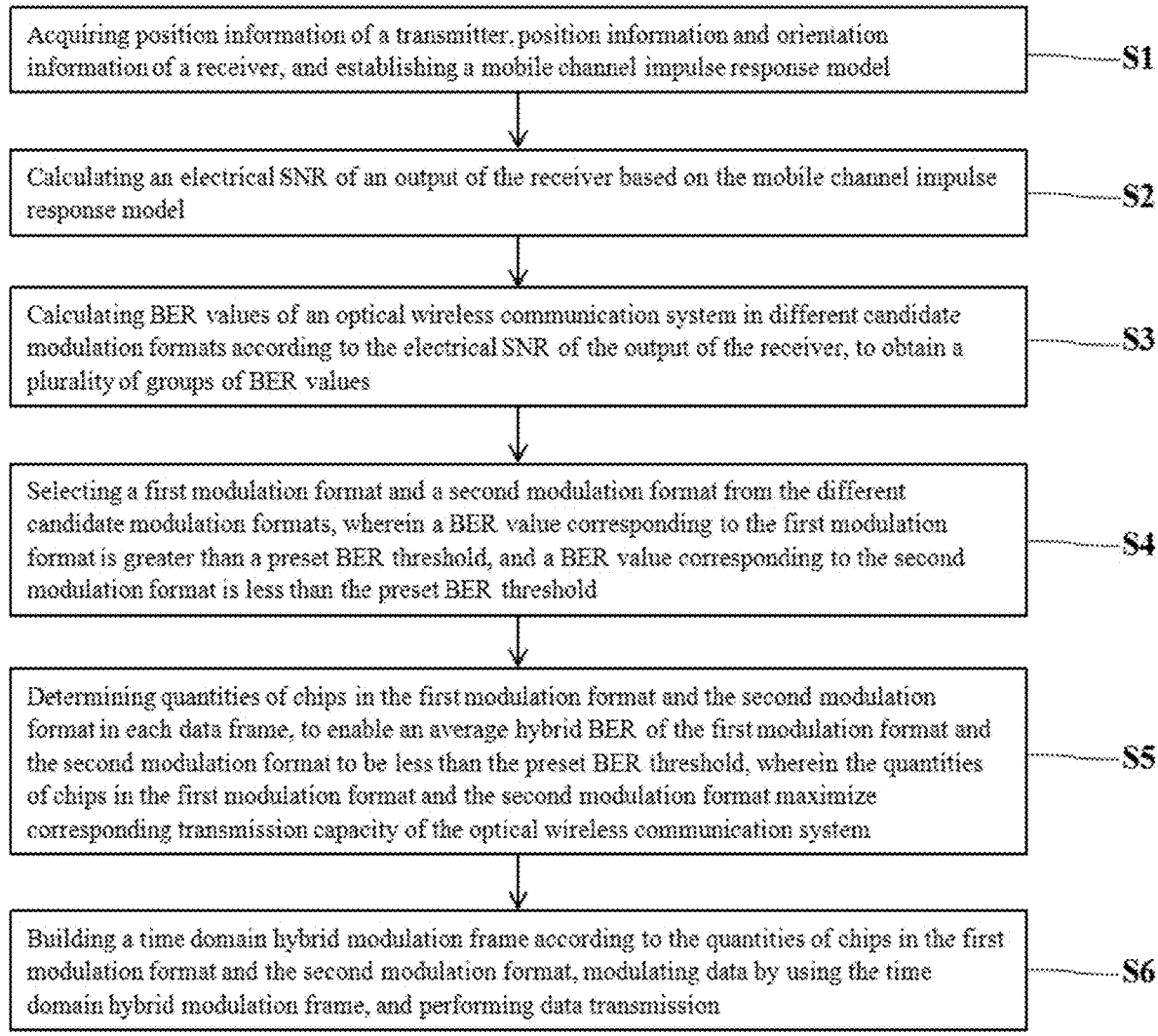
FIG. 2 is a flowchart of a capacity optimization method for a mobile optical wireless communication system according to the present invention.

Referring to FIG. 2, the present invention discloses a capacity optimization method for a mobile optical wireless communication system. Inputs in the method are terminal movement states, including information such as the position and orientation of a receiver. Constraints in the method are a BER threshold and a pulse rate supported by a device. Outputs in the method are optimized system configuration parameters such as a modulation format, a modulation order, a mixing ratio, and a hybrid frame structure. Eventually, dynamic increases of mobile transmission capacity of a system can be implemented.

The capacity optimization method for a mobile optical wireless communication system of the present invention includes the following steps.

Step 1: Position information of a transmitter, position information and orientation information of a receiver are acquired, and a mobile channel impulse response model is established.

Figure 3:
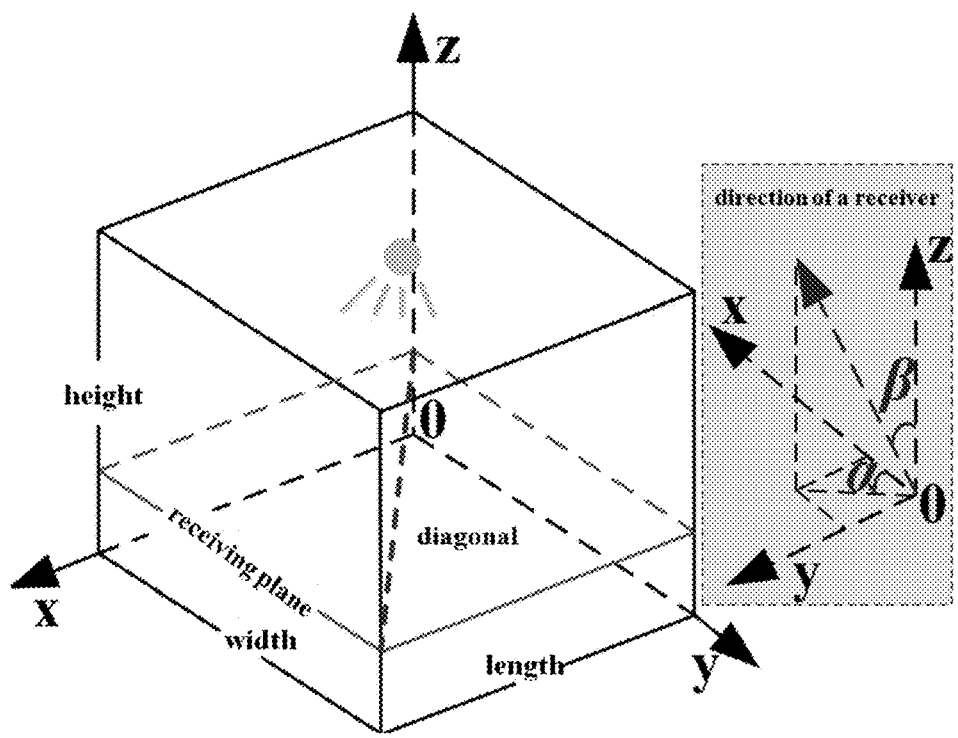
FIG. 3 shows a model of an optical wireless communication system.

Specifically, a channel state in optical wireless communication mainly depends on a geometric position relationship between the transmitter and the receiver. Therefore, movement state information of a terminal are considered, including, coordinates of the transmitter, coordinates of a receiver, and an orientation of the receiver. Coordinates $T_i$ of the transmitter are $(x_{ti}, y_{ti}, z_{ti})$, i denotes an $i^{th}$ LED light source, coordinates R of the receiver are $(x_r, y_r, z_r)$, an orientation O of the receiver is $(\alpha, \beta)$, where $\alpha$ is an orientation angle of the direction of the receiver, and $\beta$ is a polar angle of the direction of the receiver, as shown in FIG. 3 below. A mobile channel impulse response may be obtained according to the terminal movement states T, R, and O as follows:

$$h(t; T, R, O) = \sum_{i=1}^{N_{LED}} w_i \left[ H_{i,los}(0; T_i, R, O) \cdot \delta(t - \tau_{i,los}) + \int_{\tau_{i,nlos}=0}^{+\infty} A_{i,nlos}(\tau_{i,nlos}; T_i, R, O) \cdot \delta(t - d\tau_{i,nlos}) \right]; \quad (1)$$

where $N_{LED}$ is a quantity of LED light sources; and for the $i^{th}$ LED light source, $w_i$ is a weighting coefficient of a transmit power of the light source, $\tau_{i,los}$ and $\tau_{i,nlos}$ are respectively signal propagation delays of a line-of-sight link and a non-line-of-sight link, $H_{i,los(0)}$ is a normalized direct-current gain of the line-of-sight link, and $A_{i,nlos}$ is a normalized channel gain of the non-line-of-sight link.

Step 2: An electrical SNR of an output of the receiver is calculated based on the mobile channel impulse response model.

Specifically, based on Formula (1), at a receive end, an electrical SNR outputted by a photoelectric detector may be calculated, and the electrical SNR is denoted in the form of a movement state of the receiver:

$$SNR(T, R, O; R_s) = \frac{P_{r,sig}(T, R, O; R_s)}{P_{r,isi}(T, R, O; R_s) + N(T, R, O; R_s)} = \frac{\left[\gamma \int_{t_0}^{t_0+1/R_s} P_t ms(t) \otimes h(t; T, R, O) dt\right]^2}{\left[\gamma \int_{t_0+1/R_s}^{+\infty} P_t ms(t) \otimes h(t; T, R, O) dt\right]^2 + \left[\sigma_{shot}^2(T, R, O; R_s) + \sigma_{thermal}^2(R_s)\right]}, \quad (2)$$

where $P_{r,sig}$ is a power of a received signal, $P_{r,isi}$ represents inter-code interference, N is formed by a shot noise variance $\sigma^2_{shot}$ and a thermal noise variance $\rho^2_{thermal}$, $\gamma$ is the photoelectric conversion efficiency of a photodetector, $t_0$ is an integrated pulse onset time, $R_s$ is a pulse rate, $P_t$ is an average transmit power of each light source, m is a modulation index of a transmitted signal, s(t) is a normalized rectangular pulse, and $\otimes$ represents a convolution operation;

where the shot noise is further denoted as:

$$\sigma^2_{shot}(T,R,O;R_s) = 2q[\gamma \int_{t_0}^{+\infty} P_t s(t) \otimes h(t;T,R,O) dt + I_{bg} I_2] R_s \quad (3),$$

where q is the number of electron charges, $I_{bg}$ is a background current, and $I_2$ is a noise bandwidth factor; and the thermal noise is denoted as:

$$\sigma^2_{thermal}(R_s) = 8\pi k T_k \mu A R_s^2 \left( \frac{I_2}{G} + \frac{2\pi \Gamma \mu A I_3 R_s}{g_m} \right), \quad (4)$$

where k is a Boltzmann constant, $T_k$ is an absolute temperature, $\mu$ is a fixed capacitance, A is an area of a photoelectric detector, $g_m$ is a transconductance of a FET, $\Gamma$ is a channel noise factor of the FET, G is an open-loop voltage gain, and $I_3 = 0.0868$.

Step 3: BER values of an optical wireless communication system in different candidate modulation formats are calculated according to the electrical SNR of the output of the receiver, to obtain a plurality of groups of BER values. Subsequently, the obtained plurality of groups of BER values are sorted in descending order, to obtain the sorted plurality of groups of BER values. The step specifically includes the following steps.

According to the SNR in Formula (2), BERs of the optical wireless communication system may be represented as:

$$BER(T, R, O) = \begin{cases} \frac{1}{2}\text{erfc}\left(\frac{\sqrt{SNR(T, R, O) \cdot \log_2 L}}{2\sqrt{2}(L-1)}\right) & \text{For } PAM \\ \frac{1}{2}\text{erfc}\left(\frac{1}{2\sqrt{2}}\sqrt{\frac{SNR(T, R, O) \cdot L \cdot \log_2 L}{2}}\right) & \text{For } PPM \end{cases} \quad (5)$$

Here, L-PAM and L-PPM of different modulation orders are used as candidate modulation formats, PAM is pulse amplitude modulation, PPM is pulse position modulation, and L is a signal modulation order.

By using Formula (5), a BER corresponding to each different candidate modulation format is calculated, and all BER values are arranged in descending order, to obtain $BER_1$ (T, R, O), $BER_2$ (T, R, O), . . . , $BER_K$ (T, R, O), modulation formats corresponding to which are respectively denoted as a format 1, a format 2, . . . , a format K.

Step 4: A first modulation format and a second modulation format are selected from the different candidate modulation formats, where a BER value corresponding to the first modulation format is greater than a preset BER threshold, and a BER value corresponding to the second modulation format is less than the preset BER threshold. The BER values corresponding to the first modulation format and the second modulation format are adjacent values in the sorted plurality of groups of BER values. The step specifically includes the following steps.

When the terminal movement state are (T, R, O), for a particular service, the BER threshold is set to $BER_T$.

When $BER_K$ (T, R, O)≥$BER_T$>$BER_{K+1}$(T, R, O) is satisfied, a format k and a format k+1 are selected to build a time domain hybrid modulation data frame, where 1≤k<k+1≤K, the format k is denoted as the first modulation format, and the format k+1 is denoted as the second modulation format.

Step 5: quantities of chips in the first modulation format and the second modulation format in each data frame are determined, to enable an average hybrid BER of the first modulation format and the second modulation format to be less than the preset BER threshold, where the quantities of chips in the first modulation format and the second modulation format maximize corresponding transmission capacity of the optical wireless communication system. The step specifically includes the following steps.

S51: An average hybrid BER of a time domain hybrid modulation data frame is calculated as:

$$BER_{Hybrid}(T, R, O) = \frac{D \cdot SE_k(T, R, O) \cdot BER_k(T, R, O) + (1-D) \cdot SE_{k+1}(T, R, O) \cdot BER_{k+1}(T, R, O)}{(D \cdot SE_k(T, R, O) + (1-D) \cdot SE_{k+1}(T, R, O))} \leq BER_T, \quad (6)$$

where D denotes a proportion of the foregoing format k, a range of D is 0≤D≤1, and $SE_k$ and $SE_{k+1}$ respectively denote spectral efficiencies of the modulation format k and the modulation format k+1;

S52: According to the constraint condition in (6), an optimal value of D, that is, $D_{opt}$ needs to be found, to maximize a dynamic transmission capacity of the system. Therefore, the method of exhaustion is used to search for $D_{opt}$. During exhaustion, to reduce a calculation amount, D is gradually decreased starting from D=1 with an increment ΔD<0, and once the value of D fails to satisfy that the average hybrid BER is less than the preset BER threshold $BER_T$, ΔD is subtracted from the current value of D, and a result of the subtraction is used as $D_{opt}$ in the movement states (T, R, O).

S53: For the modulation format k, a quantity of chips required in each frame is $N_k$=floor($N_{total} \times D_{opt}$) for the modulation format k+1, a quantity of chips required in each frame is $N_{k+1}$=ceil($N_{total} \times (1-D_{opt})$), where floor( ) denotes rounding down, ceil( ) denotes rounding up, and $N_{total}$ is a total quantity of chips in each time domain hybrid modulation data frame.

With the correct use of the foregoing rounding functions, it can be ensured that the transmission quality of the system is reliable. That is, a BER does not exceed $BER_T$.

Step 6: Build a time domain hybrid modulation frame according to the quantities of chips in the first modulation format and the second modulation format, modulate data by using the time domain hybrid modulation frame, and perform data transmission.

A quantity $N_k$ of chips in the first modulation format is compared with a quantity $N_{k+1}$ of chips in the second modulation format.

If $N_k \geq N_{k+1}$, let I=floor($N_k/N_{k+1}$), where in a process of building a time domain hybrid modulation data frame structure, every time I symbols in the first modulation format are transmitted, one symbol in the second modulation format is transmitted, symbols in the two modulation formats are alternately transmitted, and when all chips have been transmitted, one frame has been transmitted.

If $N_k < N_{k+1}$, let I=ceil($N_{k+1}/N_k$), where in a process of building a time domain hybrid modulation data frame structure, every time I symbols in the second modulation format are transmitted, one symbol in the first modulation format requires to be transmitted, symbols in the two modulation formats are alternately transmitted, and when all chips have been transmitted, one frame has been transmitted.

The present invention further discloses a communication method of a mobile optical wireless communication system, optimized based on the capacity optimization method for a mobile optical wireless communication system, and including the following steps:

Step 1: acquiring different time domain hybrid modulation frames for preset BER thresholds of different service types and different pulse rate levels;

Step 2: storing time domain hybrid modulation frames corresponding to different preset BER thresholds and pulse rate levels in a database; and Step 3: acquiring a current preset BER threshold and pulse rate level, invoking a corresponding time domain hybrid modulation frame in the database, and performing optical wireless communication.

Specifically, the modulation format k, the modulation format k+1, and $D_{opt}$ are all related to the terminal movement states. Therefore, relationships between these parameters and the movement state of the receiver may be recorded by using a table lookup method. When the terminals are in the movement states (T, R, O) for the first time, a table index corresponding to (T, R, O) is established, and parameters of a system are initialized. Tables are divided into pages according to different service types and different pulse rate levels. In each page of table, it is assumed that a BER threshold of a service is $BER_T$, and a pulse rate supported by the system is $R_s$, the same $BER_T$ and $R_s$ are used as a constraint condition for the page of table. The coordinates T of the transmitter are usually fixed. Therefore, the following information is obtained by looking up the indoor real-time coordinates R and orientations O of terminals: the modulation format k, the modulation format k+1, and frame structures that alternate transmission conforms to (that is, related information including $N_k$, $N_{1+1}$, and I). Finally, in the proposed solution, the optimal transmission capacity $R_b$ may be obtained as follows in the terminal movement states (T, R, O):

$$R_b(T,R,O)=D_{op}(T,R,O)\cdot SE_k(T,R,O)\cdot R_s+[1-D_{op}(T,R,O)]\cdot SE_{k+1}(T,R,O)\cdot R_s \quad (7).$$

$R_b$ is used as an important reference for determining whether a service to be carried can maintain stable and reliable data transmission.

As can be seen from the foregoing steps, in the present invention, parameters of a time domain hybrid modulation scheme can be adaptively adjusted and optimized according to the terminal movement states. To transmit this type of signals, negotiation needs to be performed between a transmit end and a receive end. A feedback mechanism from the receive end to the transmit end is used herein. The following two manners are used:

Manner 1: Optimization calculation of parameters are completed by the receiver, and an optimal time domain hybrid modulation format that needs to be used and frame structure information are fed back to the transmitter. In the manner, the receiver obtains coordinate information R of the receiver through indoor wireless optical positioning. At the same time, the receiver obtains azimuthal information O (that is, the orientation) of the receiver by using an angle sensor of the receiver. Parameter optimization is then directly performed at the receive end by using the foregoing Step 1 to Step 6 by using the fixed coordinate information T of the transmitter, to obtain the optimal time domain hybrid modulation format that needs to be used and the frame structure information in the movement states (T, R, O). The optimal time domain hybrid modulation format and the frame structure information are then fed back to the transmit end through an uplink (preferably Wi-Fi), to perform adaptive communication negotiation.

Manner 2: (R,O) is fed back to the transmitter, and optimization calculation of parameters is completed by the transmitter. In the manner, to further reduce the complexity of terminals, the receiver obtains coordinate information R of the receiver through indoor wireless optical positioning. At the same time, the receiver obtains azimuthal information O (that is, the orientation) of the receiver by using an angle sensor of the receiver. The receiver then feeds back the two pieces of information (R, O) to the transmit end through an uplink (preferably Wi-Fi). The transmit end performs parameter optimization by using the foregoing Step 1 to Step 6 by combining the coordinate information T of the transmit end and the received (R, O), to obtain an optimal time domain hybrid modulation format that needs to be used and the frame structure information in the movement states (T, R, O), and informs the receiver of the optimal time domain hybrid modulation format and the frame structure information by using a downlink in a fixed modulation format before a new time domain hybrid modulation signal is transmitted.

Based on the foregoing two manners of communication negotiation between the transmit end and the receive end, the present invention discloses a mobile optical wireless communication system, including a transmitter and a receiver. An optimization module is disposed on the transmitter or the receiver, and the optimization module runs the foregoing capacity optimization method for a mobile optical wireless communication system. When the optimization module is disposed on the receiver, the optimization module calculates optimization parameter information for a time domain hybrid modulation frame, the optimization parameter information for the time domain hybrid modulation frame is transmitted by the receiver to the transmitter, and the transmitter builds the time domain hybrid modulation frame according to the received optimization parameter information for the time domain hybrid modulation frame, and performs data transmission.

When the optimization module is disposed on the transmitter, the receiver transmits position information of the receiver and orientation information of the receiver to the transmitter, the optimization module calculates optimization parameter information for a time domain hybrid modulation frame, the transmitter builds the time domain hybrid modulation frame according to the received optimization parameter information for the time domain hybrid modulation frame, the transmitter transmits the time domain hybrid modulation frame and the optimization parameter information for the time domain hybrid modulation frame to the receiver, and the receiver demodulates the time domain hybrid modulation frame according to the received optimization parameter information for the time domain hybrid modulation frame.

In addition, in the method proposed above, if the position and the direction of the terminal are kept unchanged, the format of the transmitted hybrid signal and the proportion $D_{opt}$ are kept unchanged. The transmission signal needs to be selected and optimized again according to new movement state information only when either the position or the direction of the terminal changes.

In a case that a terminal has a fixed movement pattern, that is, the receiver periodically repeats one same movement trajectory or rotation direction, the position coordinates and azimuthal angle at each moment are predicted according to the movement pattern (for example, an initial position, a speed, and a direction) of the terminal, and then the optimal time domain hybrid modulation formats that need to be used in various movement states and the frame structure information are stored in a table according to Steps 1 to 6. When the receiver moves periodically, optimal time domain hybrid modulation parameters at each moment can be obtained by periodically looking up the table to maximize the transmission capacity in periodical movement.

To evaluate the proposed capacity optimization method for a mobile optical wireless communication system, a specific indoor space scenario with a dimension of 8 m×8 m×3 m (L×W×H) is considered in this embodiment. A light source is deployed on the ceiling, and a mobile terminal is located in a receiving plane with a height of 0.85 m, as shown in FIG. 3. In FIG. 3, the azimuthal angle α and the polar angle β used in this patent to indicate the orientation of the receiver are further defined in this embodiment.

In the following figures, from FIG. 4 to FIG. 8, this embodiment considers an LED transmitter light source mounted at coordinates (4, 4, 3) and emitting light downward. A light emission power of the LED transmitter light source is 18 W. In addition, this embodiment assumes that the receiver is facing upward and a signal component received by the receiver is mainly from a line-of-sight link.

Figure 9:
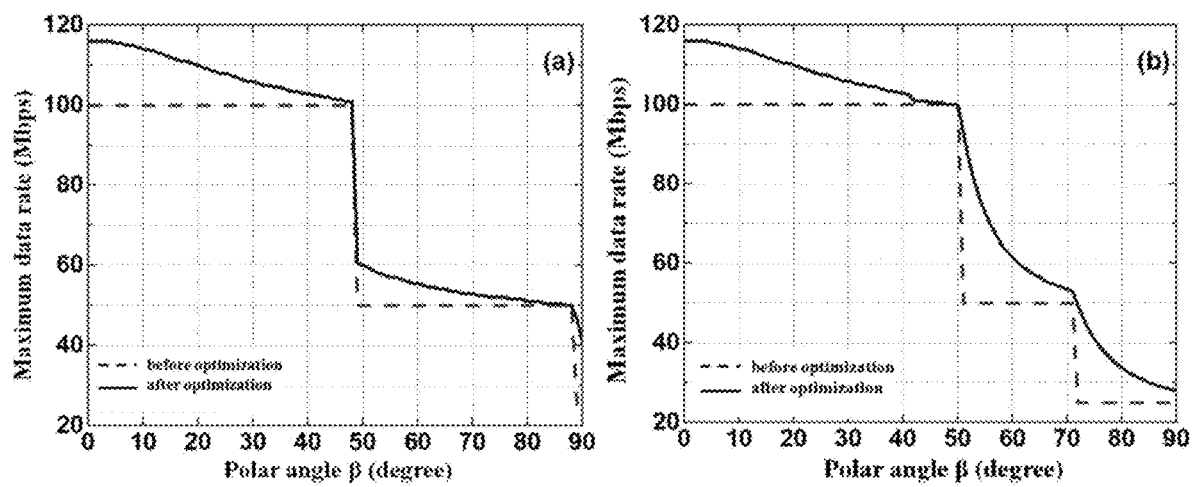
FIG. 9 is a comparison diagram of transmission capacity when a receiver is tilted, where (a) α=0°; and (b) α=45°.

For FIG. 9, this embodiment considers a total of four LED light sources installed at coordinates (3, 3, 3), (3, 5, 3), (5, 3, 3), and (5, 5, 3). Each LED light source has a light emission power of 4.5 W. In addition, a case that the receiver is tilted, that is, the orientation of the receiver changes, is considered. The received signal component includes both a line-of-sight link component and a non-line-of-sight link component.

Figure 4:
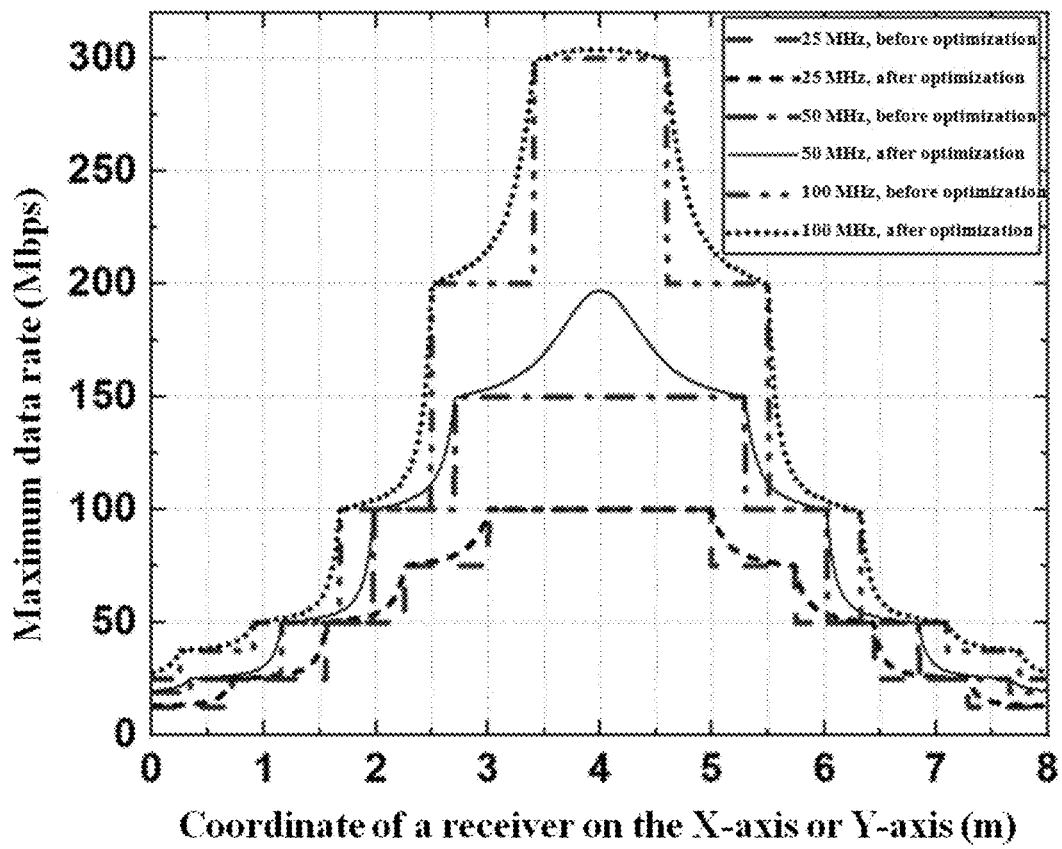
FIG. 4 is a comparison diagram of transmission capacity of different positions on a diagonal.

Positions on a dashed diagonal in the receiving plane shown in FIG. 3 are used as an example for analysis. In FIG. 4, the transmission capacity at different positions on the diagonal are compared before and after the proposed optimization scheme is adopted. Different pulse rates $R_s$ are considered, and a BER threshold $BER_T$ of a service is set to $4.6 \times 10^{-3}$. That is, when a BER is not greater than $4.6 \times 10^{-3}$, it is considered that error-free transmission can be implemented with the help of a FEC code. As shown in FIG. 4, for a conventional single-carrier scheme, because discrete modulation formats are used, the system capacity drops dramatically when the terminal moves from the center to a corner position. However, after the proposed capacity optimization scheme is used, the capacity curve shows a continuous change. Therefore, the proposed method helps to effectively compensate for a data rate drop caused by conventional discrete modulation formats, especially, near a position where a modulation format is changed.

Figure 5:
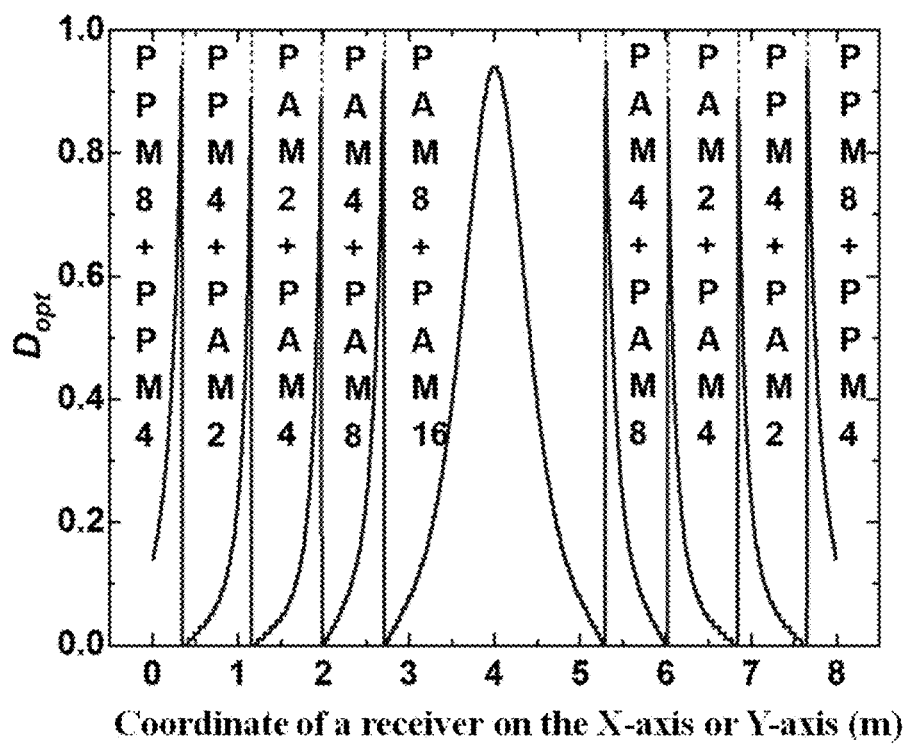
FIG. 5 shows modulation formats used in optimization schemes proposed at different positions on a diagonal and corresponding $D_{opt}$.

Based on FIG. 4, when $R_s$ is 50 MHz, FIG. 5 gives two hybrid modulation formats that need to be adopted during the use of the proposed optimization scheme at different positions on a diagonal and the corresponding $D_{opt}$. It can be seen that a range of the diagonal is divided into nine regions. Each region has a respective adopted time domain hybrid modulation format. For example, a combination of PPM8+PPM4 is used at the furthest corner position, a combination of PAM8+PAM16 is used at the middlemost position, and hybrid modulation formats used at other positions are all listed in the figure. A blue curve is the optimal proportion $D_{opt}$ of one hybrid modulation format with higher spectral efficiency in two hybrid modulation formats used at each position. It can be seen that because the position of the receiver keeps changing, $D_{opt}$ needs to be continuously optimized and adjusted to implement the optimal spectral efficiency.

Figure 6:
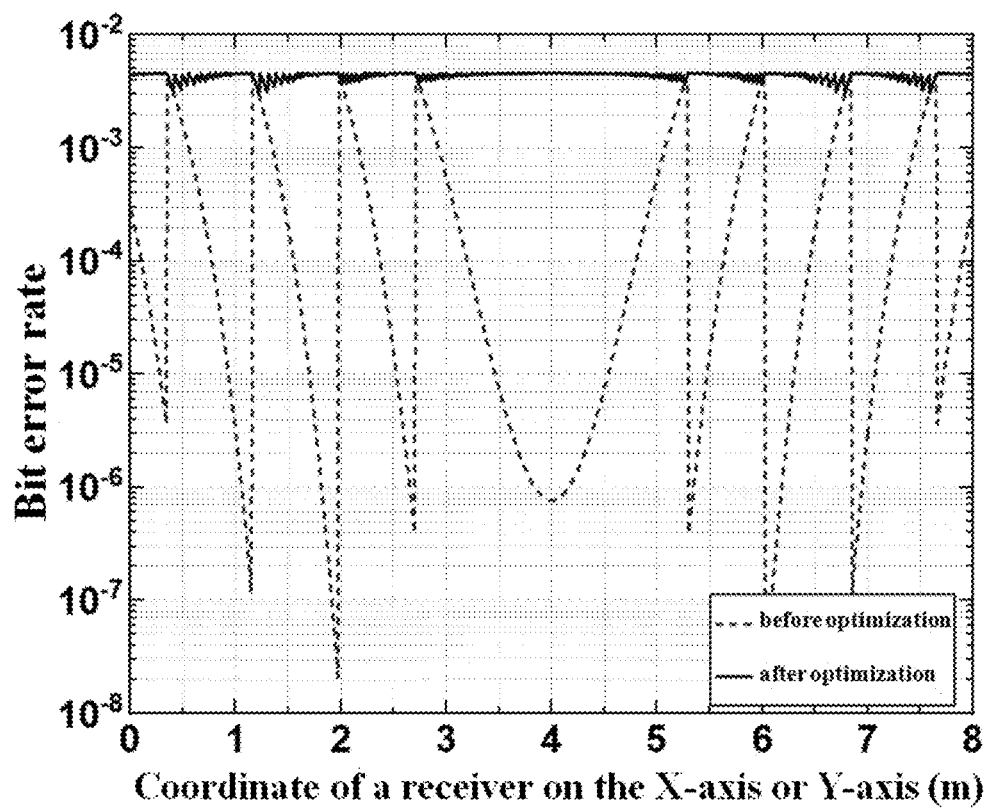
FIG. 6 is a comparison diagram of BERs of different positions on a diagonal.

Based on FIG. 5, BER performance of the system at different positions on a diagonal are compared in FIG. 6. To obtain a higher SNR, a BER of the system in the proposed optimization scheme always stays close to $BER_T = 4.6 \times 10^{-3}$ but does not exceed the value. Therefore, while reliable quality of mobile transmission is ensured, the transmission efficiency of the system can be improved as much as possible. (Explanation: After FEC is adopted, a very low BER means to some extent a waste of spectrum resources. In fact, a BER only needs to be less than or equal to the $BER_T$, and does not need to be very low).

Figure 7:
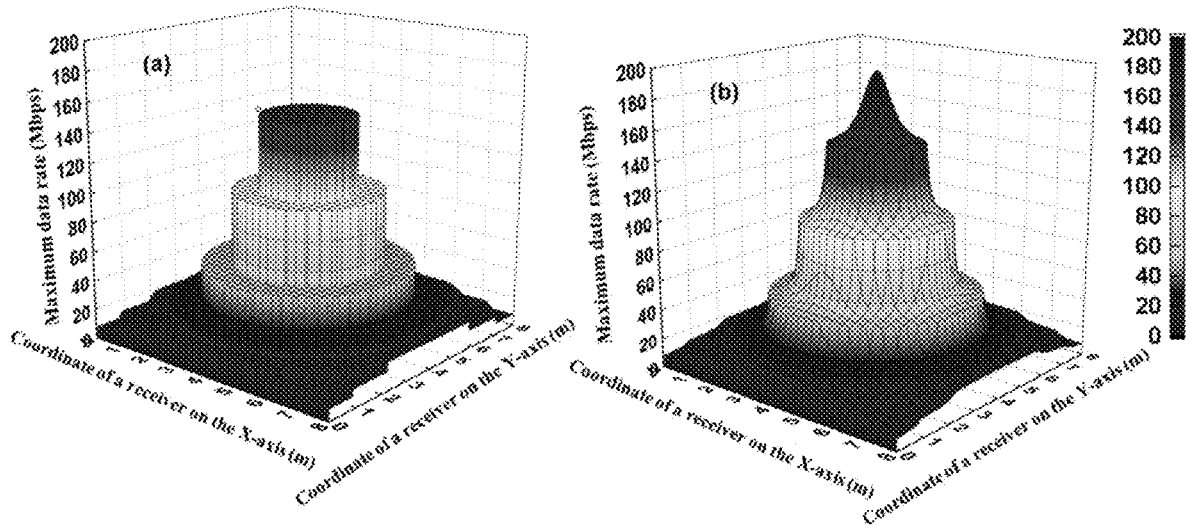
FIG. 7 is a comparison diagram of transmission capacity of two modulation schemes in a receiving plane, where (a) uses a conventional adaptive modulation method, and (b) uses an optimization method of the present invention.

When $R_s$ is 50 MHz, in FIG. 7, in this embodiment, the system transmission capacity in the receiving plane before and after the proposed optimization scheme is used is compared. It can be seen that the use of the proposed optimization method can effectively increase the system capacity at various positions throughout the receiving plane. For example, when the receiver is located at (4, 4, 0.85), the maximum data rate may be increased from 150 Mbps (only PAM8 is used) to 197 Mbps (mixed PAM8+PAM16 is used).

Figure 8:
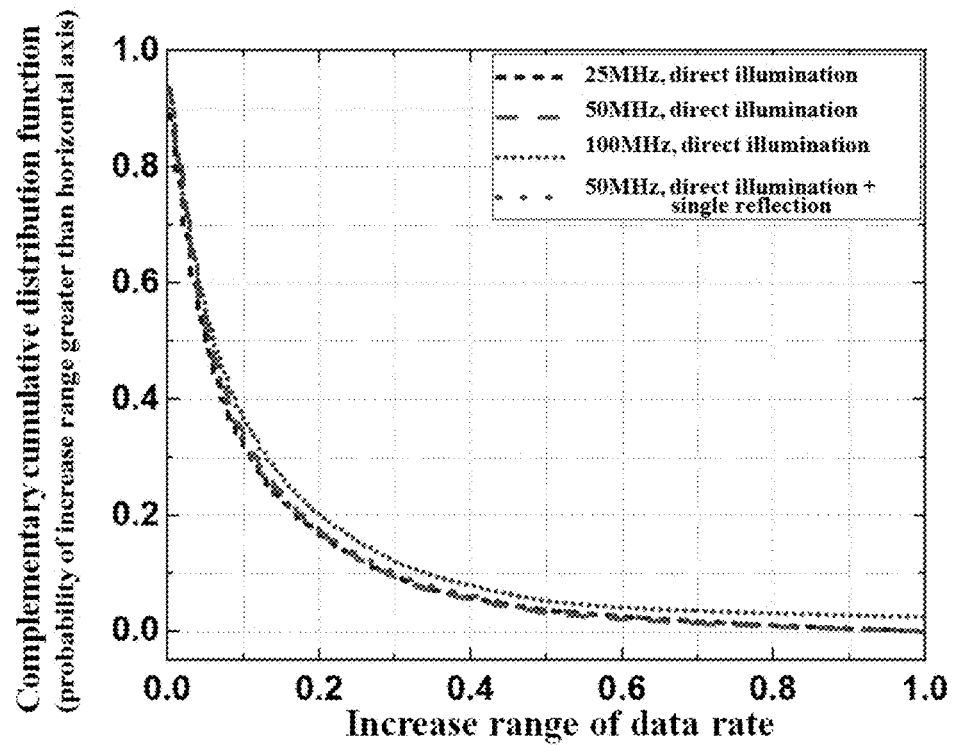
FIG. 8 is a schematic diagram of a complementary cumulative distribution function (CCDF) of an increase range of data transmission capacity.

For different $R_s$, FIG. 8 shows increases in the transmission capacity that can be obtained in the receiving plane by using the proposed optimization method. In this embodiment, through statistics, a CCDF for an increase range of a data rate is given. According to statistical results, when $R_s$ is 100 MHz, a total of 19.8% of the indoor area within the entire receiving plane can obtain a capacity increase greater than 20%.

Considering that a mobile terminal rotates in different orientations, FIG. 9 compares cases that the azimuthal angle and the polar angle of the receiver change within a particular range at the position with coordinates of (4, 4, 0.85). Solid lines in the figure give the maximum data rate that can be obtained in each orientation. It may be seen that when the receiver is tilted, the system capacity of mobile optical wireless communication can still be effectively improved by using the proposed optimization method.

The foregoing embodiments are merely preferred embodiments used to fully describe the present invention, and the protection scope of the present invention is not limited thereto. Equivalent replacements or variations made by a person skilled in the art to the present invention all fall within the protection scope of the present invention. The protection scope of the present invention is as defined in the claims.

What is claimed is:

1. A capacity optimization method for a mobile optical wireless communication system, comprising steps of:
    S1: acquiring position information of a transmitter, position information and orientation information of a receiver, and establishing a mobile channel impulse response model;
    S2: calculating an electrical signal-to-noise ratio (SNR) of an output of the receiver based on the mobile channel impulse response model;
    S3: calculating bit error rate (BER) values of an optical wireless communication system in different candidate modulation formats according to the electrical SNR of the output of the receiver, to obtain a plurality of groups of BER values;
    S4: selecting a first modulation format and a second modulation format from the different candidate modulation formats, wherein a BER value corresponding to the first modulation format is greater than a preset BER threshold, and a BER value corresponding to the second modulation format is less than the preset BER threshold;
    S5: determining quantities of chips in the first modulation format and the second modulation format in each data frame, to enable an average hybrid BER of the first modulation format and the second modulation format to be less than the preset BER threshold, wherein the quantities of chips in the first modulation format and the second modulation format maximize corresponding transmission capacity of the optical wireless communication system; and
    S6: building a time domain hybrid modulation frame according to the quantities of chips in the first modulation format and the second modulation format, modulating data by using the time domain hybrid modulation frame, and performing data transmission.

2. The capacity optimization method for a mobile optical wireless communication system according to claim 1, wherein S3 further comprises: sorting the obtained plurality of groups of BER values in descending order, to obtain the sorted plurality of groups of BER values; and wherein in S4, the BER values corresponding to the first modulation format and the second modulation format are adjacent values in the sorted plurality of groups of BER values.

3. The capacity optimization method for a mobile optical wireless communication system according to claim 1, wherein S6 comprises:

comparing a quantity $N_k$ of chips in the first modulation format with a quantity $N_{k+1}$ of chips in the second modulation format, and if $N_k \geq N_{k+1}$, letting I=floor($N_k/N_{k+1}$), wherein in a process of building a time domain hybrid modulation data frame structure, every time I symbols in the first modulation format are transmitted, one symbol in the second modulation format is transmitted, symbols in the two modulation formats are alternately transmitted, and when all chips have been transmitted, one frame has been transmitted, or if $N_k < N_{k+1}$, letting I=ceil($N_{k+1}/N_k$), wherein in a process of building a time domain hybrid modulation data frame structure, every time I symbols in the second modulation format are transmitted, one symbol in the first modulation format requires to be transmitted, symbols in the two modulation formats are alternately transmitted, and when all chips have been transmitted, one frame has been transmitted.

4. The capacity optimization method for a mobile optical wireless communication system according to claim 1, wherein S1 comprises:

obtaining a mobile channel impulse response according to terminal movement states T, R, and O:

$$h(t; T, R, O) = \sum_{i=1}^{N_{LED}} w_i \left[ H_{i,los}(0; T_i, R, O) \cdot \delta(t - \tau_{i,los}) + \int_{\tau_{i,nlos}}^{+\infty} A_{i,nlos}(\tau_{i,nlos}; T_i, R, O) \cdot \delta(t - d\tau_{i,nlos}) \right],$$

wherein coordinates $T_i$ of the transmitter are $(x_{ti}, y_{ti}, z_{ti})$, i denotes an $i^{th}$ LED light source, coordinates R of the receiver are $(x_r, y_r, z_r)$, an orientation O of the receiver is $(\alpha, \beta)$, $\alpha$ is an orientation angle of the direction of the receiver, and O is a polar angle of the direction of the receiver; $N_{LED}$ is a quantity of LED light sources; and for the $i^{th}$ LED light source, $w_i$ is a weighting coefficient of a transmit power of the light source, $\tau_{i,los}$ and $\tau_{i,nlos}$ are respectively signal propagation delays of a line-of-sight link and a non-line-of-sight link, $H_{i,los(0)}$ is a normalized direct-current gain of the line-of-sight link, and $A_{i,nlos}$ is a normalized channel gain of the non-line-of-sight link.

5. The capacity optimization method for a mobile optical wireless communication system according to claim 4, wherein S2 comprises:

$$SNR(T, R, O; R_s) = \frac{P_{r,sig}(T, R, O; R_s)}{P_{r,isi}(T, R, O; R_s) + N(T, R, O; R_s)} = \frac{\left[\gamma \int_{t_0}^{t_0+1/R_s} P_t ms(t) \otimes h(t; T, R, O) dt\right]^2}{\left[\gamma \int_{t_0+1/R_s}^{+\infty} P_t ms(t) \otimes h(t; T, R, O) dt\right]^2 + \left[\sigma_{shot}^2(T, R, O; R_s) + \sigma_{thermal}^2(R_s)\right]},$$

wherein $P_{r,sig}$ is a power of a received signal, $P_{r,isi}$ represents inter-code interference, N is formed by a shot noise variance $\sigma^2_{shot}$ and a thermal noise variance $\sigma^2_{thermal}$, $\gamma$ is the photoelectric conversion efficiency of a photodetector, to is an integrated pulse onset time, $_Rs$ is a pulse rate, $P_t$ is an average transmit power of each light source, m is a modulation index of a transmitted signal, s(t) is a normalized rectangular pulse, and ß represents a convolution operation;

wherein the shot noise is further denoted as:

$$\sigma^2_{shot}(T,R,O;R_s) = 2q[\gamma\int_{t_0}^{+\infty} P_t s(t) ß h(t; T,R,O) dt + I_{bg} I_2] R_s,$$

wherein q is the number of electron charges, $I_{bg}$ is a background current, and $I_2$ is a noise bandwidth factor; and the thermal noise is denoted as:

$$\sigma^2_{thermal}(R_s) = 8\pi k T_k \mu A R_s^2 \left( \frac{I_2}{G} + \frac{2\pi \Gamma \mu A I_3 R_s}{g_m} \right),$$

wherein k is a Boltzmann constant, $T_k$ is an absolute temperature, μ is a fixed capacitance, A is an area of a photoelectric detector, $g_m$ is a transconductance of a field effect transistor (FET), Γ is a channel noise factor of the FET, G is an open-loop voltage gain, and $I_3 = 0.0868$.

6. The capacity optimization method for a mobile optical wireless communication system according to claim 5, wherein S3 comprises steps of:

calculating BERs of the optical wireless communication system as:

$$BER(T, R, O) = \begin{cases} \frac{1}{2} \text{erfc}\left( \frac{\sqrt{SNR(T, R, O) \cdot \log_2 L}}{2\sqrt{2}(L-1)} \right) & \text{For PAM} \\ \frac{1}{2} \text{erfc}\left( \frac{1}{2\sqrt{2}} \sqrt{\frac{SNR(T, R, O) \cdot L \cdot \log_2 L}{2}} \right) & \text{For PPM} \end{cases},$$

wherein L-PAM and L-PPM of different modulation orders are used as candidate modulation formats, PAM is pulse amplitude modulation, PPM is pulse position modulation, and L is a signal modulation order; and calculating a BER corresponding to each different candidate modulation format, and arranging all BER values in descending order, to obtain $BER_1$ (T, R, O), $BER_2$ (T, R, O), . . . , $BER_K$ (T, R, O), modulation formats corresponding to which are respectively denoted as a format 1, a format 2, . . . , a format K.

7. The capacity optimization method for a mobile optical wireless communication system according to claim 6, wherein S4 comprises:

when the terminal movement states are (T, R, O), setting the BER threshold to be $BER_T$; and when $BER_K$ (T, R, O)>$BER_T$>$BER_{K+1}$ (T, R, O) is satisfied, selecting a format k and a format k+1 to build a time domain hybrid modulation data frame, wherein 1≤k<k+1≤K, the format k is denoted as the first modulation format, and the format k+1 is denoted as the second modulation format.

8. The capacity optimization method for a mobile optical wireless communication system according to claim 6, wherein S5 comprises steps of:

S51: calculating an average hybrid BER of a time domain hybrid modulation data frame as:

$$BER_{Hybrid}(T, R, O) = \frac{D \cdot SE_k(T, R, O) \cdot BER_k(T, R, O) + (1-D) \cdot SE_{k+1}(T, R, O) \cdot BER_{k+1}(T, R, O)}{D \cdot SE_k(T, R, O) + (1-D) \cdot SE_{k+1}(T, R, O)} \leq BER_T,$$

wherein D denotes a proportion of the foregoing format k, a range of D is 0≤D≤1, and $SE_k$ and $SE_{k+1}$ respectively denote spectral efficiencies of the modulation format k and the modulation format k+1;

S52: obtaining an optimal value of D, denoted as $D_{opt}$, to maximize a dynamic transmission capacity of the optical wireless communication system, specifically comprising: gradually decreasing D starting from D=1 with an increment ΔD<0, and once the value of D fails to satisfy that the average hybrid BER is less than the preset BER threshold $BER_T$, subtracting ΔD from the current value of D, and using a result of the subtraction as $D_{opt}$ in the movement states (T, R, O); and S53: for the modulation format k, a quantity of chips required in each frame is $N_k$=floor($N_{total} \times D_{opt}$), and for the modulation format k+1, a quantity of chips required in each frame is $N_{k+1}$=ceil($N_{total} \times (1-D_{opt})$), wherein floor( ) denotes rounding down, ceil( ) denotes rounding up, and $N_{total}$ is a total quantity of chips in each time domain hybrid modulation data frame.

9. A communication method of a mobile optical wireless communication system, optimized based on the capacity optimization method for a mobile optical wireless communication system according to claim 1, and comprising steps of:

acquiring different time domain hybrid modulation frames for preset bit error rate (BER) thresholds of different service types and different pulse rate levels;

storing time domain hybrid modulation frames corresponding to different preset BER thresholds and pulse rate levels in a database; and acquiring a current preset BER threshold and pulse rate level, invoking a corresponding time domain hybrid modulation frame in the database, and performing optical wireless communication.

10. A mobile optical wireless communication system, comprising a transmitter and a receiver, wherein an optimization module is disposed on the transmitter or the receiver, and the optimization module implementing the capacity optimization method for a mobile optical wireless communication system according to claim 1;

when the optimization module is disposed on the receiver, the optimization module calculates optimization parameter information for a time domain hybrid modulation frame, the optimization parameter information for the time domain hybrid modulation frame is transmitted by the receiver to the transmitter, and the transmitter builds the time domain hybrid modulation frame according to the received optimization parameter information for the time domain hybrid modulation frame, and performs data transmission; or when the optimization module is disposed on the transmitter, the receiver transmits position information of the receiver and orientation information of the receiver to the transmitter, the optimization module calculates optimization parameter information for a time domain hybrid modulation frame, the transmitter builds the time domain hybrid modulation frame according to the received optimization parameter information for the time domain hybrid modulation frame, the transmitter transmits the time domain hybrid modulation frame and the optimization parameter information for the time domain hybrid modulation frame to the receiver, and the receiver demodulates the time domain hybrid modulation frame according to the received optimization parameter information for the time domain hybrid modulation frame.

* * * * *